Patented July 8, 1952

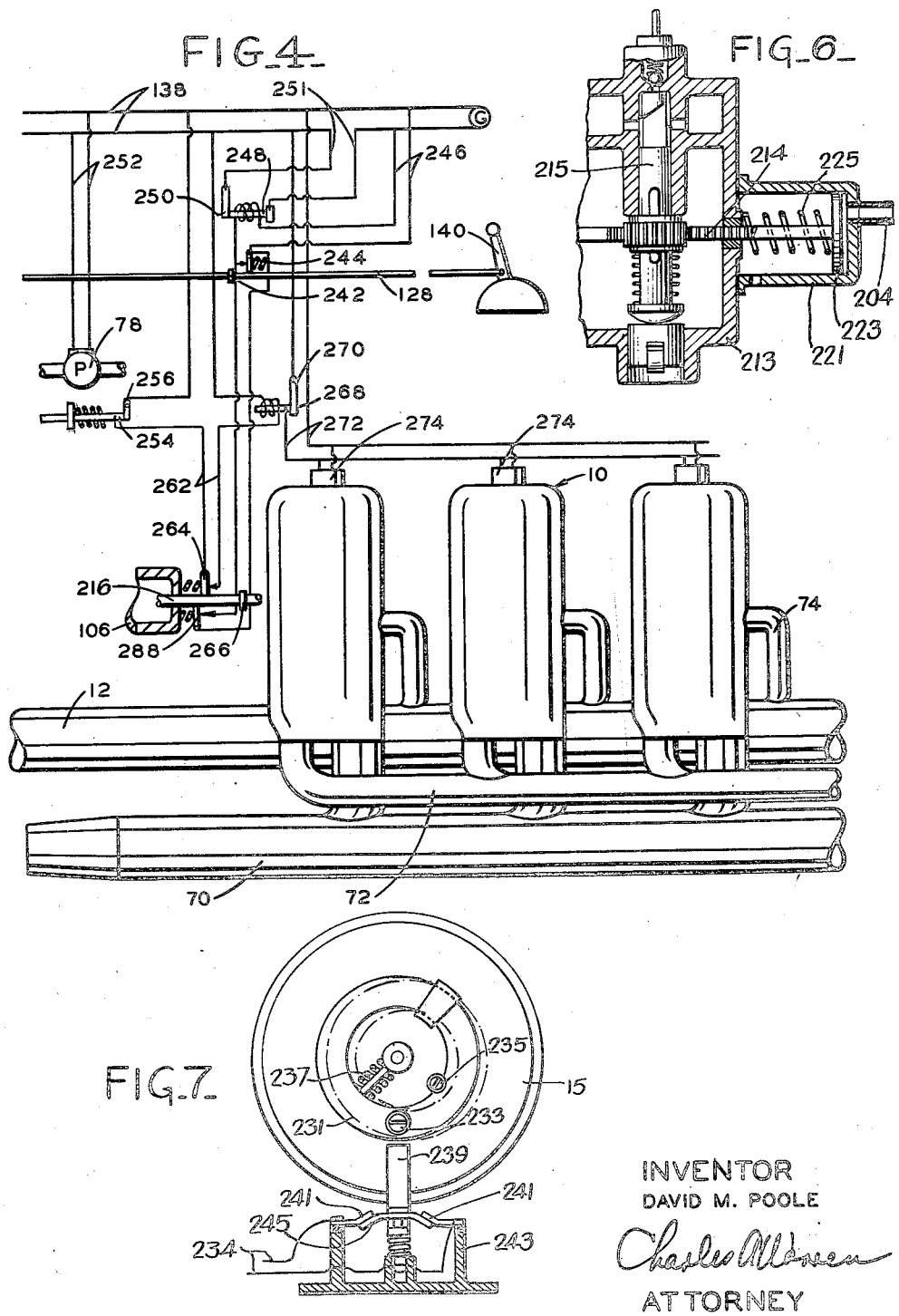

2,602,287

UNITED STATES PATENT OFFICE 2,602,287

STARTING CONTROL SYSTEM FOR POWER PLANTS

David M. Poole, Summit, N. J., assignor to United Aircraft Corporation, East Hartford, Conn., a corporation of Delaware Application April 15, 1944, Serial No. 531,310

10 Claims. (Cl. 60—13)

This invention relates to a control system for an aircraft power plant which includes gas generators supplying gas to a turbine which drives a propeller. A burner may be used between the generators and the turbine for adding heat to the gas.

In this type of power plant a number of gas generators may be used for supplying gas for one turbine. A feature of the invention is the control of all of the generators simultaneously.

In order to simplify the controls by which the pilot may adjust the operation of the power plant, the invention involves the use of a single control lever which functions not only to control the operation of the unit through the entire power range but also causes starting of the generators upon movement into starting position. This control member may also adjust the supply of fuel during starting of the generators.

Another feature of the invention is an arrangement by which to prevent operation of the starting system for the generators until a supply of fuel is available at the generators.

Other objects and advantages will be apparent from the specification and claims, and from the accompanying drawings which illustrate an embodiment of the invention.

Fig. 4 is a diagram of the remainder of the electrical system.

Fig. 5 is a sectional view through one of the intake valves.

Fig. 6 is a sectional view through one of the fuel injection devices.

Fig. 7 is an end view of an overspeed governor.

Figure 1:
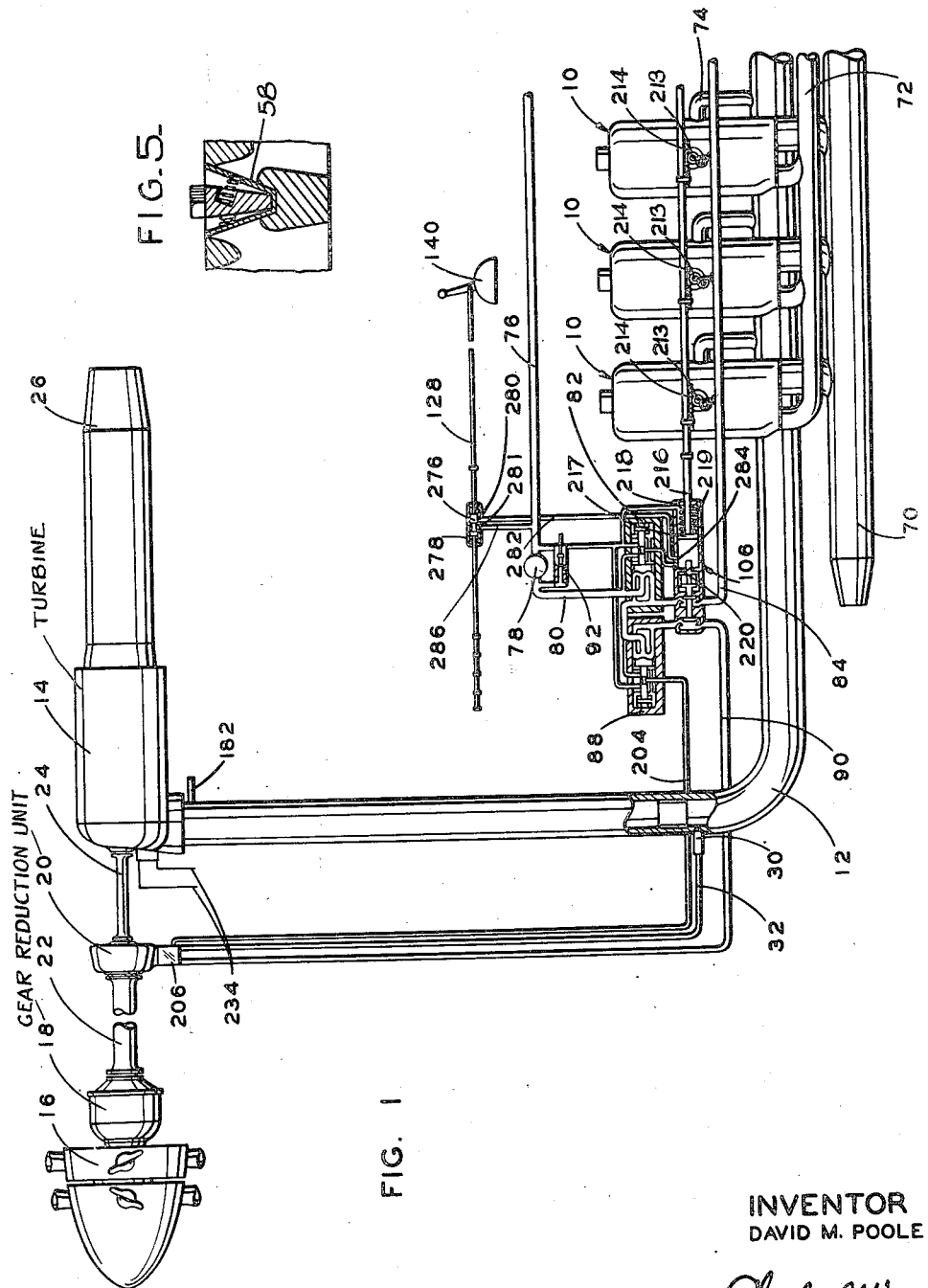
Fig. 1 is a diagrammatic view of the power plant showing the fuel supply system.

The generators 10 supply hot gas under pressure through a duct 12 to the intake of the turbine 14. The latter is connected to a propeller system 16 through gear reduction units 18 and 20 and shafts 22 and 24. The turbine exhaust discharges as a jet through a restricted nozzle 26 which may be directed rearwardly of the aircraft to produce an additional propulsive thrust.

The gas is heated between the generators and the turbine by discharging fuel into duct 12 through a fuel nozzle 30 supplied by a fuel line 32. Fuel is admitted at a point spaced far enough from the turbine to assure complete burning of the fuel before the power gas has reached the turbine inlet.

Figure 2:
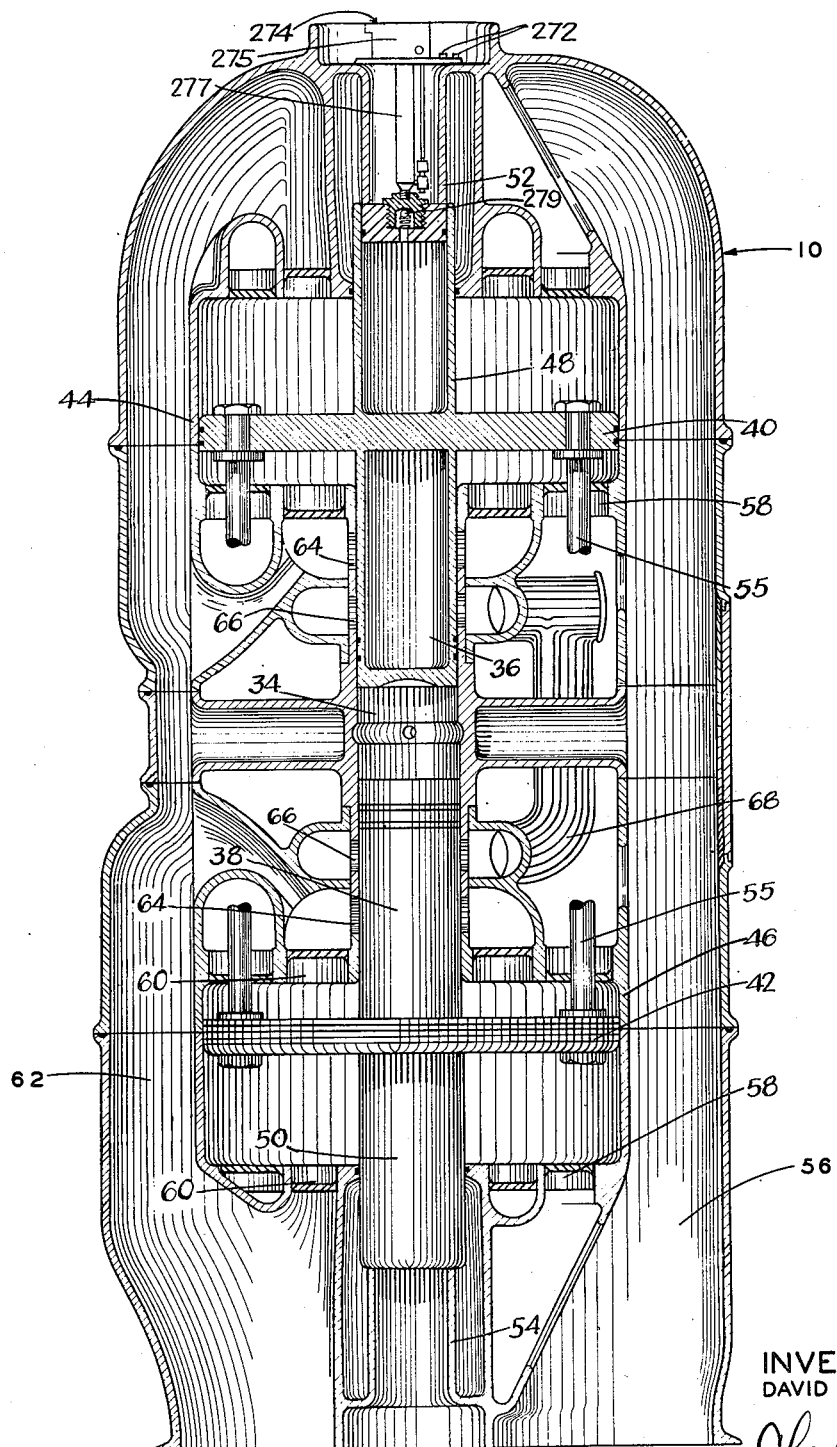
Fig. 2 is a sectional view on a larger scale of one of the generators.

As shown in Fig. 2 each generator is in the form of a free-piston engine-and-compressor unit comprising an engine cylinder 34 having reciprocating pistons 36 and 38 to which compressor pistons 40 and 42 in cylinders 44 and 46 are integrally connected. Sleeves 48 and 50 attached to the compressor pistons complete the reciprocating piston assemblies. The sleeves, in combination with pistons 52 and 54 over which they reciprocate, form air spring cylinders.

The piston assemblies are moved apart by the burning of the fuel injected into the engine cylinder between the engine pistons. Air compressed in the air spring cylinders on the power stroke returns the piston assemblies. The assemblies are maintained at equal distances from the center of the engine cylinder by a linkage of which rods 55 may form a part.

Intake manifold 56 conducts air to sets of intake valves 58 through which air alternately enters opposite ends of the compressor cylinders. The compressed air leaves the cylinders through sets of discharge valves 60 also at opposite ends of the compressor cylinders and passes through scavenge manifold 62 and through ports 64 which are uncovered by pistons 36 and 38 at the end of the power stroke. Air entering these ports is blown through the engine cylinder and discharges through exhaust ports 66 into exhaust manifolds 68, Fig. 2.

The intake manifolds of the several units are connected to an intake duct 70. The scavenge manifolds are interconnected by a pipe 72. The exhaust gases flow from the exhaust manifolds through pipes 74 into duct 12.

Figure 3:
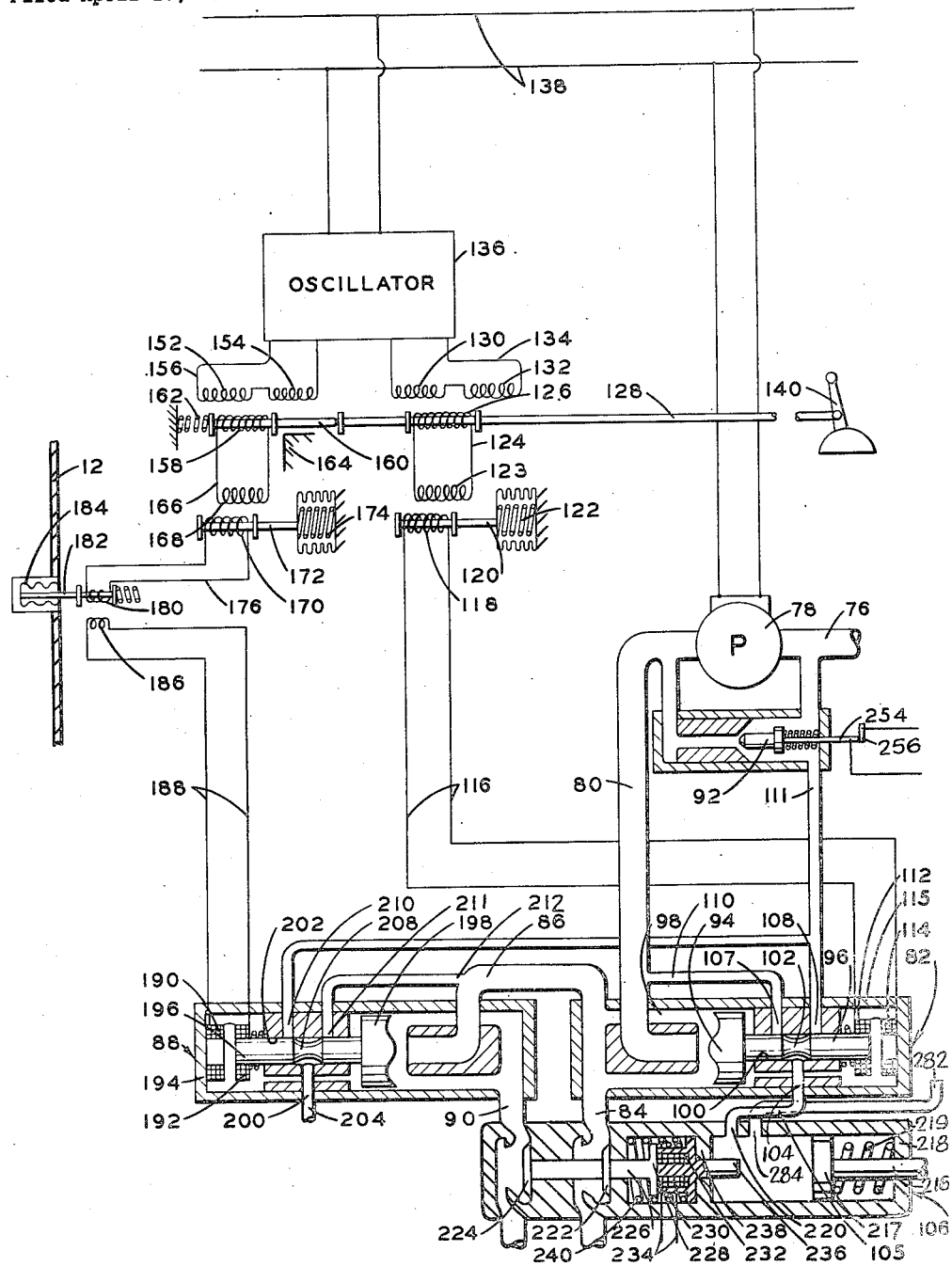
Fig. 3 is a diagram of the fuel control system and a part of the electrical system.

Referring to Fig. 3, fuel for the generators and the burner is delivered from a supply, not shown, through a pipe 76 to a pump 78. From this pump fuel flows through a conduit 80 to a control device 82 by which the total fuel flow to the power plant is controlled. From control device 82 fuel flows through a conduit 84 to the generators 10. A part of the fuel from device 82 may discharge through a conduit 86 to a control device 88 by which the burner fuel is controlled. From device 88 a conduit 90 directs fuel to line 32, Fig. 1, and thence to the burner nozzle.

Pressure in the supply conduit 80 is adjusted by relief valve 92 in a bypass for a pump. Fuel entering device 82 discharges against the head 94 of a plunger 96, and is directed by this head through an annular path 98 to conduits 84 and 86. Plunger 96 slides in a bore 100 and has a groove 102 in line with a port 104 connected by a conduit 105 to a device 106 forming a part of the control device for the generator fuel. Groove 102 alternately connects port 104 with a supply port 107 or a vent port 108. Port 107 is connected by a conduit 110 to a supply of control fluid which may be the conduit 80 in which event a part of the fuel is used as the control fluid. Vent port 108 may be connected by a duct 111 to conduit 76.

The end of plunger 96 has a solenoid 112 in spaced relation to a stationary coil 114 in the end of the casing 115 for the control device 82. These coils 112 and 114 have bucking fields and the plunger 96 which adjusts the supply of control fluid to device 106 is moved by a change in the repulsive effect between these coils. Coils 112 and 114 are connected in series and in opposition in a circuit 116 which includes an induction coil 118 mounted on a rod 120 projecting from a pressure sensitive bellows 122.

In a fixed position in parallel relation to coil 118 is a coil 123 in a circuit 124 which includes an induction coil 126 on a rod 128. Coil 126 is moved relative to opposed coils 130 and 132 having bucking fields in a circuit 134 which includes an oscillator 136 receiving power from supply lines 138.

Rod 128 is connected to a control lever 140 by which the pilot may adjust the fuel supply to the power plant. Movement of lever 140 places coil 126 more or less in line with coil 130 and out of a position to be affected by coil 132, thus varying the induced voltage in coil 126. The repulsive effect between coils 112 and 114 increases as coil 126 is moved to the left, causing plunger 96 to move to the left and connecting supply port 107 to port 104, thereby admitting fluid under pressure to the device 106. As the atmospheric pressure decreases coil 118 is moved out of alignment with coil 123 decreasing the induced voltage in coil 118 and thus decreasing the repulsive effect between coils 112 and 114. Plunger 96 then moves to the right to connect port 104 and vent port 108 for reducing the quantity of fuel delivered to the generators.

The plunger 96 in addition to being moved by the repulsive effect between coils 112 and 114 is also moved by the thrust exerted on the head 94 by the flow of fuel from conduit 80 against the head. Thus, if the plunger 96 is moved to the left by the action of the coils indicating a requirement for more fuel, the plunger is restored to the neutral position shown by the increased thrust on the head resulting from the increase of fuel. The device 106, by which an increase of fuel is obtained, will be described in detail later.

The burner fuel flow is similarly controlled. Coils 152 and 154, with bucking fields, are in series in a circuit 156 which includes the oscillator 136. A coil 158 is movable with respect to coils 152 and 154 being carried on a rod 160, the end of which is in a position to be engaged and moved by rod 128 during its movement to the left. A spring 162 moves rod 160 toward the right against a stop 164 so located that when rod 128 moves toward the right, rod 160 will be stopped when coil 158 is midway between the opposed coils 152 and 154. In this position no voltage is induced in the circuit 166 which includes coil 158 and a stationary coil 168.

Coil 168 is adjacent to a movable coil 170 on a rod 172 extending from a pressure sensitive bellows 174 which moves coil 170 more or less out of direct opposition to coil 168 in response to changes in atmospheric pressure. Coil 170 is in a circuit 176 which includes a movable coil 180 on a rod 182 extending from a temperature sensitive element 184 mounted in duct 12 adjacent to the turbine intake. As the temperature in duct 12 increases by burning fuel in the duct, coil 180 is moved with respect to a fixed coil 186, thereby decreasing the induced voltage in a circuit 188 which includes the repulsion coils 190 and 192. Coil 190 is mounted in the end of a casing 194 for the device 88. Coil 192 is mounted on a plunger 196 projecting from the head 198 against which the burner fuel is discharged from duct 86.

A port 200 entering the bore 202 in which plunger 196 slides is connected by conduit 204 to a device 206 actuated by device 88 and adapted for increasing the fuel flow by pressure in conduit 204. A groove 208 in plunger 196 alternately connects this port to a vent port 210 or to a supply port 211, the latter being connected by a conduit 212 to conduit 86. As the repulsive effect between coils 190 and 192 is increased, as by motion of coil 158 to the left, plunger 196 is moved to the right to increase the pressure of control fluid through device 88 to the device 206. The neutral position of the plunger in which both ports 210 and 211 are covered is restored by the increasing thrust on head 198 resulting from the increased flow of fuel against the head and into the conduit 90.

The above described controls are intended to provide a total fuel flow proportional to the extent of movement of the control lever 140 and at a predetermined lever setting to start the burner in operation. During the part of the power plant operation when the burner is on, the burner fuel is subtracted from the total fuel flow, the latter being under the control of device 82 and the burner fuel being controlled by device 88. The atmospheric bellows 122 and 174 reduce the supply of fuel to both generators and burner as the atmospheric pressure decreases. Furthermore, the temperature responsive device 184 reduces the burner fuel as the maximum desired turbine inlet temperature is approached. This fuel control is fully described in the copending application of Kalitinsky and Meitzler, Serial Number 531,304, filed April 15, 1944, now Patent No. 2,447,124 and will not be described in greater detail.

The fuel supply to the generators may be by injection device 213 (see also Fig. 6), all connected to conduit 84, and each having a rack 214 for turning the plunger 215, Fig. 6, by means of which the quantity of fuel may be adjusted. Such injection devices are well-known as shown in Patent No. 2,093,984; it is sufficient to note for the purpose of this invention that each device is arranged so that when rack 214 is moved to the right, Fig. 1, the quantity of fuel injected for each engine stroke will be increased. These racks may all be connected to a rod 216 for simultaneous movement. A piston 217 on the end of rod 216 moves in a casing 218 forming a part of device 106 and is urged toward the left by a spring 219 in a direction to reduce the quantity of fuel supplied to the generators by the injection devices.

Conduit 105 is connected to a port 220 in casing 218, and fluid under pressure from this conduit moves the piston 217 and rod 216 against spring 219 to increase the rack setting. Thus, when the control circuit of Fig. 3 is adjusted for greater fuel quantity by movement of lever 140 the racks 214 are all moved to the right under the action of fluid entering cylinder 218.

Fuel is supplied to the burner through the device 206 which may be a well-known form of injection pump similar to device 208, Fig. 6, the quantity of fuel delivered being controlled by a rack, as shown. It is sufficient to note for purposes of this invention that the rack setting is increased by the admission of fluid under pressure from duct 204, as for example into a cylinder 221 having a piston 223 which may be mounted on the rack. A spring 225 opposes the fluid pressure delivered from duct 204. The rack setting is decreased by venting fluid through duct 204. Fuel is delivered to the device 206 through conduit 90 and reaches the nozzle 30 through line 32 the pump being actuated from a moving part of the gear reduction unit. The arrangement is such that the rack may be set to zero for that part of the power plant operation when the burner is off.

As a safety feature the fuel supply to both burner and generators may be automatically cut off if the turbine overspeeds. To accomplish this, both conduits 84 and 90 have valves 222 and 224 which may be located in a part of casing 218. These valves are mounted on a stem 226 having a head 228 engaging a spring 230 by which the valves are urged into closed position. A coil 232 normally holds the valves in the open position shown.

An overspeed governor which may be of conventional construction, as for example, the type shown in Edmunds Patent No. 2,062,121, is mounted on the turbine shaft and normally closes a circuit 234 including coil 232. Upon overspeeding of the turbine the overspeed governor breaks the circuit, and the valves are closed by the spring 230. As shown in Fig. 7, the governor may include a ring 231 supported on the end of the turbine shaft 15 by a screw 233 and held against a stop 235 by a spring 237. When the centrifugal force acting on the ring, which is eccentric to the shaft axis, overcomes the load on the spring and moves the ring into the dot-dash position shown, the ring engages the plunger 239 to open the circuit 234 including the contacts 241 on the base 243, and the connector 245 on the plunger.

Coil 232 is mounted on a plunger 236 normally held in the position shown against a flange 238 by a spring 240. Plunger 236 is in a position to engage piston 217 when the latter approaches the left-hand end of its movement, so that upon a failure of control fluid in cylinder 218 or upon shut-down of the power plant, piston 217 will engage the plunger, and, by the action of spring 219 which is heavier than spring 240, will close valves 222 and 224.

Referring to Figure 4, the power plant is started by moving the control lever 140 into starting and idling position. In this position a stop 242 on rod 128 permits a pivoted contact 244 to close a circuit 246 connecting with power lines 138 and including a coil 248 in series with the contact 244. Coil 248 surrounds the plunger of a switch 250, and, when energized, closes the switch 250 in a circuit 251 to supply power to the main supply lines 138 to the left of the connection of the circuit 251 with one of the main lines. When switch 250 is closed power is supplied to pump 78 through leads 252, thus filling the fuel supply system and the conduits for the control fluid, and to oscillator 136, Fig. 3.

The relief valve 92 for the pump 78 has a projecting rod 254 which forms the movable element of a switch 256, Fig. 3, and this switch is adapted to be closed by engagement between rod 254 and a fixed contact 257, Fig. 3, when the fuel system is filled and the relief valve is moved to open the pump by-pass. This switch is in a timing circuit 262 and is in series with a switch 264 having a movable contact engaged by a stop 266 on rod 212. This switch is closed when the piston 217, Fig. 3, with its rod 216, has been moved from its extreme left-hand end into a position to provide the desired rack setting for starting the generators.

Circuit 262 also includes a coil 268 adapted when energized to close a switch 270 in a starting circuit 272 which also includes starting units 274 on each of the generators 10. These units may be of any type such as the starting device described in the copending Kalitinsky application, Serial No. 520,055, filed January 28, 1944, now Patent No. 2,501,056, dated March 21, 1950. By this arrangement, starting of the generators will take place only when the fuel system is full, when pump 78 is operating, and when the injection pumps are set at the proper position for starting. As shown in Fig. 2, the starting unit 274 may be a cartridge discharging mechanism having a cartridge holding and firing device 275 which may be electrically actuated, the device communicating with one of the air springs through a tube 277 and a check valve 279 located in the head of the piston 52. This type of device is fully described in the Coffman Patent No. 2,284,640.

To maintain the desired rack setting during starting, thereby avoiding the injection of excessive quantities of fuel, a plunger 276, Fig. 1, on rod 128 slides in a casing 278 and is adapted when lever 140 is in starting position to connect a port 280 to a vent port 281. Port 280 is connected by a duct 282 to a port 284 in cylinder 218 spaced from the inlet port 220 the distance that the piston 217 should move for placing the racks of the injection devices in starting position. Port 282 may be connected by a conduit 286 to the supply conduit 76.

In stopping the power plant it is desirable to restore the devices 82 and 88 as well as device 106 to the position of zero fuel flow which necessitates keeping the oscillators and pump in operation until the generators stop. If the control lever 140 is pulled back to the zero fuel setting, the circuit including contact 244 will be opened to break circuit 246 through coil 248. To prevent switch 250 from being opened until the control devices reach the position of zero fuel supply, a switch 288 is placed in parallel with switch 244 in circuit 246 so that this switch will maintain a circuit through coil 248 until the stop 266 on rod 216 engages the movable element of switch 288 and opens it. The switch 288 is located so that it is opened by stop 286 just as rod 216 reaches the extreme end of its movement to the left, this movement occurring as a result of the movement of lever 140 to zero fuel position.

With the controls in the position shown the generators and burner are all in operation. If the control lever 140 is moved to the left for more power, coils 126 and 128 move to the left with a resulting movement of plunger 96 to the left and plunger 196 to the right. Movement of plunger 96 to the left admits fluid to cylinder 218 moving rod 216 to the right and increasing the rack setting for the generator injection pumps. The increased fuel used by these pumps increases the pressure on head 94 and restores plunger 96 to its normal position. Similarly, motion of plunger 196 to the right causes fluid to enter cylinder 221 to increase the rack setting of the burner fuel pump.

A decrease in altitude will, by moving coil 118 or coil 170, provide for an increase of fuel to the generator and burner in a similar way. A decrease in fuel obtained by movement of lever 140 to the right (or by an increase in altitude) causes an opposite effect as will be apparent.

In stopping the unit, the lever 140 is moved to the right to "stop" position, thereby moving coil 126 to neutral position causing plunger 96 to move to the right for venting cylinder 218 and thus causing the racks of the generator injection pumps to move to "zero" setting. During the movement of lever 140, the rod 160 engaged stop 164 when coil 156 reached neutral position and thereby cut off the fuel delivery to the burner by causing the rack for the burner injection pump to be moved to "zero" position.

As the lever 140 approaches "stop" position, collar 242 engages and opens switch 244, but the circuit 246 through coil 248 is still closed by switch 288 since a definite time interval is required for the fluid to vent from cylinder 218. The power plant continues to operate, therefore, during the time that the rod 212 is moving to the left until the racks on the generator fuel pumps have been moved by this rod to "zero" setting. Collar 266 then opens switch 288, the circuit through coil 248 is broken and the pump 78 stops.

In starting, lever 140 is moved to the left into "start" position. This motion causes switch 244 to close, energizing coil 248 and closing switch 250 to supply power to pump 78. When the system is full of liquid and the desired pressure is developed, relief valve 92 is opened and closes switch 256. The movement of lever 140 into "start" position also moves coil 126 out of neutral position and causes fluid to enter cylinder 218 moving piston 217 into a position to uncover port 284. Since plunger 276, Fig. 1, is in a position to vent duct 282 the piston 217 remains in a position just uncovering port 284 until the generators are started. In this position of piston 217 the collar 266 on rod 216 has moved away from switch 264 to allow it to close and cause the circuit 262 through coil 268 for closing the starting circuit 272. When the generators are operating the power may be increased by moving lever 140 to the left, thus closing the vent for port 284 so that piston 217 may move beyond starting position to increase the rack setting for the generator injection pumps.

If the turbine overspeeds circuit 234 is broken, coil 232 is deenergized and valves 222 and 224 are closed by spring 230 to cut off all fuel to generators and burner.

It is to be understood that the invention is not limited to the specific embodiment herein illustrated and described, but may be used in other ways without departure from its spirit as defined by the following claims.

I claim:

1. A power plant including at least one generator of gas under pressure, a fuel pump for said power plant, and a starting circuit for said generator, in combination with means for completing said starting circuit in response to operation of the pump.

2. A power plant including at least one engine-and-compressor unit, a pump for supplying fuel to said unit, and a starting circuit for said unit, in combination with means for completing said starting circuit in response to operation of the pump.

3. A power plant including at least one generator of gas under pressure, a pump for supplying fuel to said generator, an injection pump having means for adjusting the fuel quantity delivered to said generator, and a starting control for said generator, in combination with means for rendering said starting control means operative in response to movement of said adjusting means to a predetermined position for supplying the proper amount of fuel for starting the generator.

4. A power plant including at least one engine-and-compressor unit, an injection pump for delivering fuel to said unit, said pump having means for adjusting the quantity of fuel delivered, and a starting control for said unit, in combination with means for rendering said starting control operative in response to movement of said adjusting means to the predetermined position for supplying the proper amount of fuel for starting the unit.

5. A power plant including at least one engine-and-compressor unit, a pump for supplying fuel to said unit, an injection pump for delivering the fuel to the unit, said injection pump having means for adjusting the quantity of fuel injected, and a starting control for said unit, in combination with means for rendering said starting control operative in response to movement of adjusting means to a predetermined position and in response to operation of the supply pump.

6. A power plant including at least one engine-and-compressor unit, means for adjusting the quantity of fuel supplied to the unit, a device movement of which operates said adjusting means, a starting circuit for said unit, and means responsive to movement of said device for rendering operative said starting circuit in combination with other means operated by said device for limiting the movement of said adjusting means during starting of the unit.

7. A power plant including a number of engine-and-compressor units, a lever movement of which adjusts the fuel supplied to said units, and a starting control for said units, in combination with means movable by said lever for procuring operation of the starting control and for adjusting the fuel supply to the quantity necessary for operation of the units.

8. A power plant including at least one generator of gas under pressure, a pump for supplying fuel to said generator and a control fluid for the power plant, an injection pump having means for adjusting the fuel quantity delivered to said generator, said adjusting means being actuated by said control fluid, and a starting control for said generator, in combination with means for rendering said starting control operative when said adjusting means are moved to a predetermined position which insures the proper operating supply of fuel to the generator.

9. A power plant including at least one generator of gas under pressure, a pump for supplying fuel to said generator and a control fluid for the power plant, an injection pump having means for adjusting the fuel quantity delivered to said generator, said adjusting means being actuated by said control fluid, and a starting control for said generator, in combination with means for rendering said starting control operative when said adjusting means are moved to a predetermined position which insures the proper operating supply of fuel to the generator and when said pump is operating.

10. A power plant including at least one engine-and-compressor unit, a pump for supplying fuel to said unit and control fluid for the power plant, means actuated by the control fluid for adjusting the quantity of fuel delivered to the unit, a control device movement of which causes operation of said adjusting means, a starting circuit for said unit, and means responsive to movement of said control device for rendering operative said starting circuit, in combination with means associated with said control device for controlling the delivery of control fluid to said adjusting means for limiting the movement of said adjusting means during starting of the unit.

DAVID M. POOLE.

REFERENCES CITED

The following references are of record in the file of this patent:

UNITED STATES PATENTS

| Number | Name | Date |
|---|---|---|
| Re. 22,385 | Coffey | Oct. 26, 1943 |
| 1,363,694 | Tampier | Dec. 28, 1920 |
| 1,385,680 | Hamer | July 26, 1921 |
| 1,846,237 | Weiche | Feb. 23, 1932 |
| 1,965,372 | Drabelle | July 3, 1934 |
| 1,967,538 | Romeyn | July 24, 1934 |
| 2,010,469 | Triebnigg | Aug. 6, 1935 |
| 2,147,935 | Steiner | Feb. 21, 1939 |
| 2,167,951 | Janicke | Aug. 1, 1939 |
| 2,265,285 | Janicke | Dec. 9, 1941 |
| 2,290,921 | Udale | July 28, 1942 |
| 2,292,288 | Pateras-Pescara | Aug. 4, 1942 |
| 2,355,177 | Pateras-Pescara | Aug. 8, 1944 |
| 2,370,249 | Korte et al. | Feb. 27, 1945 |

FOREIGN PATENTS

| Number | Country | Date |
|---|---|---|
| 402,371 | France | Aug. 26, 1909 |
| 720,953 | France | Dec. 12, 1931 |
| 346,108 | Great Britain | Apr. 9, 1931 |
| 480,101 | Great Britain | Feb. 14, 1938 |